United States Patent [19]

Coury

[11] 4,349,068

[45] Sep. 14, 1982

[54] METHOD FOR IMPROVED HEAT TRANSFER

[76] Inventor: Glenn E. Coury, 6600 W. 13th Ave., Ste. 2, Lakewood, Colo. 80214

[21] Appl. No.: 82,561

[22] Filed: Oct. 9, 1979

[51] Int. Cl.$^3$ .................... F28D 13/00; F28D 15/00
[52] U.S. Cl. ............................ 165/1; 165/104.27;
165/DIG. 5; 165/DIG. 24
[58] Field of Search .......... 165/174, 109, 158, 104.27, 165/DIG. 24, 1, DIG. 5; 62/504, 525

[56] References Cited

U.S. PATENT DOCUMENTS 2,797,899  7/1957  Funk et al. .................... 165/104.32

FOREIGN PATENT DOCUMENTS 604450 10/1934  Fed. Rep. of Germany ...... 165/158

*Primary Examiner*—Frank Sever
*Attorney, Agent, or Firm*—Kyle W. Rost

[57] ABSTRACT

A heat exchanger used in the multi-stage flash distillation process is provided at the cool end with a gas injection device that creates two-phase flow within the tube side of the heat exchanger. At the hot end, the two-phase flow is degasified and the gas recycled through the cool end. Alternatively, where multiple heat exchanger modules are used, the two-phase flow from each tube in the first exchanger is directly routed to a tube of the second exchanger, or the two-phase flow from the first exchanger is separated and the individual phases are recombined in the entrance of the second exchanger. A gas injection device is used for creation of the two-phase flow, and this employs a gas chamber with gas supply tubes running into the liquid inlet ends of the heat exchanger tubes to introduce the gas uniformly into each tube.

7 Claims, 4 Drawing Figures

METHOD FOR IMPROVED HEAT TRANSFER

BACKGROUND OF THE INVENTION

1. Field of the Invention

The invention relates to distillation apparatus and also to separatory distillation processes. In particular, the invention relates to processes to stabilize distillation for inhibiting scale and preventing corrosion, under pressure or vacuum, and also relates to processes for flash vaporization of the distilland. In particular, a method for improved heat transfer is disclosed that is generally applicable to a wide range of fluid treatment applications, and specifically applicable to desalination plants.

2. Description of the Prior Art

Desalination of saline waters has been accomplished by the multi-stage flash (MSF) process, or other processes requiring preheating of the brine streams, such as the vertical tube evaporation (VTE) process, or the combined vertical tube evaporator/multi-stage flash (VTE/MSF) processes. During the heating, they are maintained under pressure so as to prevent boiling or vaporization within the tubes, and the salt waters are heated as a single phase liquid. After attaining the maximum temperature, the brines are allowed to pass successively through a number of flash chambers arranged in series. The pressure in each chamber is lower than in the preceding chamber, and is lower than the temperature at which evaporation of water can occur. Thus, as the brine enters a flash chamber, part of it is vaporized while at the same time the remaining brine is cooled somewhat. The cooled brine then passes into the next, lower pressure chamber where the flash evaporation is repeated. The steam evaporated in each chamber flows into the shell side of the brine heat exchanger, wherein it is condensed as it passes over the outside of the aforementioned tubes or conduits, within which the saline feed water is being heated.

The highest temperature to which the brine is heated within the tubes is normally limited by the potential for formation of scale on the inside of the tubes, such as a calcium carbonate ($CaCO_3$) or a calcium sulphate ($CaSO_4$) scale, and by the method used to prevent or inhibit the formation of such scale. The acid-treated plant, wherein the brine feed is pretreated by acidification to cause the conversion of carbonates to carbon dioxide ($CO_2$) gas, can sustain brine temperatures to as high as 250° F. The chemical treatment plant, where a chemical (often a proprietary mixture) is added to the feed to inhibit scale formation, is often limited to a maximum brine temperature of 180° F. to 200° F.

The design of MSF distillation plants, or the brine heaters of other distillation plants, is constrained by various requirements. For example, the velocity of the saline water must not be less than some minimum value (often 5 or 6 feet per second), so as to prevent fouling of the tube surface. Also, the tube diameter must not be less than some minimum value (often ½ to ⅝ inches) to prevent plugging of the tube entrances by blockage due to marine life that could be nourished and grow within the system. These constraints, together with the heat transfer coefficients that are attainable, often lead to a very long plant geometry. For example, a low temperature (190° F. maximum temperature of the saline feed waters) chemically-treated plant may be four hundred feet long; said plant may consist of up to forty flash chambers, each of them being approximately ten feet in length.

Various methods have been proposed to increase the heat transfer coefficient in the heat exchangers of the MSF distillation process and in the brine heaters of other distillation processes such as the VTE or VTE/MSF processes. One method is to change the geometry of the tube surface, so that there are various protrusions or projections, such as with the finned tube, the fluted tube, the corrugated tube, or the spiral tube. Another method is to add a chemical to the steam phase condensing on the outside of the tube, or to change the structure of the outside surface of the tube, so as to promote condensation of the steam as droplets instead of as a continuous film of condensate. These methods are all effective in varying degrees, but are not as effective as the present invention with respect to providing the design flexibility to greatly reduce the size of the desalination plant. In addition, any of these methods could be used together with the present invention, if economically warranted, to provide potentially greater benefits than one method taken alone.

It has been proposed in the past that carbon dioxide ($CO_2$) gas be dissolved in the saline water under pressure before the saline water is passed through the tubes of the brine heat exchanger. Since $CO_2$ in water forms an acid, this process, in effect, is simply another form of the acidification pretreatment process previously described for scale prevention; the $CO_2$ acid is merely substituted for some other acid, such as sulfuric acid. However, this method calls for the essential dissolution of the $CO_2$ in the liquid saline water, so that the fluid passing through the brine heater is a single phase, all liquid saline stream. In the present invention, if $CO_2$ gas is used as the gas phase to promote two-phase flow within the brine heater tubes, it would have the incidental effect of acidifying the brine stream, by partial dissolution of the $CO_2$ into the liquid brine stream, in the same manner as would any other dissolved acid, and would thereby diminish the potential for formation of scale within the tubes.

Also known in the prior art are falling film evaporators, wherein the rate of heat transfer is increased by cycling some of the water vapor through the evaporator tubes. Such an arrangement employs vertical tubes having a thin film of water passing along the inner wall of each tube, and the vapor is recycled and also passed downwardly through the tube to increase the total gas flow rate in the tube, thereby increasing the turbulence level within the tube, which in turn increases the heat transfer rate. This type of evaporator is known only in situations where the gas employed in creating the two phase flow is the vapor of the liquid, and one goal of the process is the production of the vapor. Therefore, such falling film evaporators are not functional in applications where, heretofor, formation of vapor within the evaporator was not a desired end of the process.

SUMMARY OF THE INVENTION

Savings in cost and materials and energy are achieved in a desalination plant of the type requiring preheating of a brine system, including the MSF, VTE, and MSF/VTE systems. An independent gas phase is added to the brine flowing through the heat exchanger tubes so as to promote a two-phase flow system within the tubes. At the hot end of the heat exchanger tubes, the gas phase may be separated and recycled, or the two-phase flow mixture may be routed to a subsequent heat exchanger module, either by direct transmission of the mixture from the tubes of one heat exchanger to the tubes of the next heat exchanger; or by separating the gas and liquid, and routing each independently of the next heat exchanger where the gas is reintroduced in a uniform manner to the tubes thereof.

The primary object of the invention is to improve heat transfer in distillation plants, thereby reducing material and construction costs. A two-phase flow mixture is proposed for use in plants where, due to prior art teachings, it was believed necessary to prevent or at least inhibit formation of a gas phase within the tubes of a heat exchanger. Yet, by use of the two-phase flow mixture, the heat transfer coefficient is increased, and the length of heat exchanger is correspondingly decreased.

Another object of the invention is to create means for transferring the two-phase flow mixture between consecutive heat exchanger modules, for application in those instances where a single module is not employed. For this purpose, two types of apparatus have been developed, one of which directs the flow mixture from each tube of the first module to a tube of the second module in one-to-one correspondence. Another apparatus collects and separates the phases, and then routes each phase separately to the second module, where the gas is reintroduced to the liquid to recreate the two-phase flow.

A further object is to create means for uniformly injecting the gas stream into the heat exchanger tubes to create the two-phase flow. This is accomplished by creation of a gas distribution device that cooperates with the water box at one end of the heat exchanger module. The distribution device allows water or other liquid in the water box to enter the heat exchanger tubes while the device injects gas into each tube. Thus, mixing of the gas and liquid takes place in the tube, where the desired effects of the mixing are realized. The gas distribution device is applicable to initial injection of the gas stream to liquid entering the first heat exchanger module, or to subsequent reinjection of the gas stream in a multiple module distillation plant.

An important object is to create a two-phase flow mixture using an independent gas stream. Gases are known to become dissolved in liquid, and some gases may condense, thereby returning to liquid state. For purposes of the invention, it is desired that the gas phase retain its identity, although the flow regime may be bubble flow, plug flow, stratified flow, wavy flow, slug flow, annular flow, spray flow, or any other flow pattern found in liquid/gas mixtures. Where water is the the liquid, for example, the gas is preferred to something other than water vapor to avoid the possibility that the gas would condense and the gas phase be substantially eliminated. Therefore, gases such as air, nitrogen, and carbon dioxide are preferred, as under the conditions of a water distillation plant these gases can be employed in quantities and at pressures such that a gas phase will remain present in the heat exchanger tubes.

A further object is to employ two-phase flow in a horizontal or near horizontal flow regime. The MSF process is quite commonly practiced with horizontal heat exchangers, and a major benefit of the invention is in the shortening of plant length, thus reducing the land size needed per plant.

DESCRIPTION OF THE PREFERRED EMBODIMENT

Figure 1:
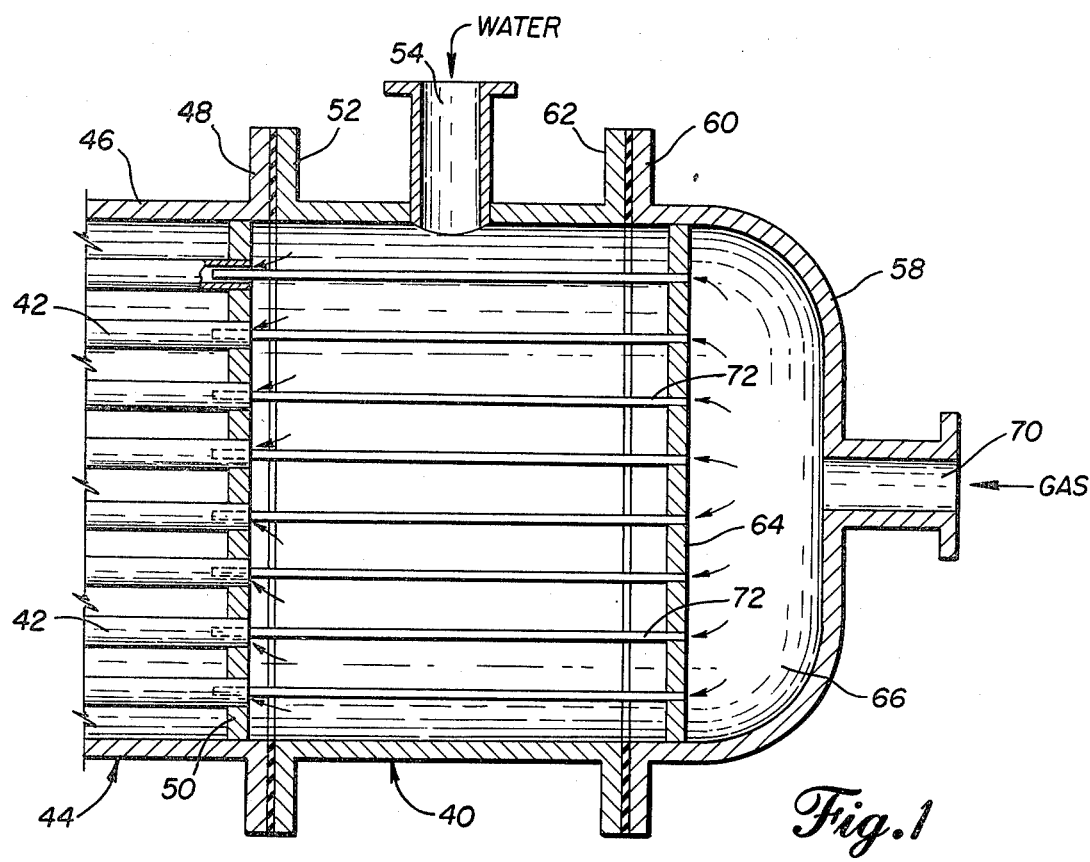
FIG. 1 is a longitudinal cross-sectional view of one end of a heat exchanger module employing the gas distribution device in conjunction with the module entrance water box.

The invention relates to a method of improved heat transfer that may be broadly applied to a variety of processing plants for different liquids. The principles involved will be described in connection with a desalination plant, which is the presently preferred application of the method, although other applications in which fluids are heated are anticipated.

In accordance with current technology, a modern multi-stage flash desalination plant may be composed of a brine heater, a plurality of heat recovery modules, and a heat rejection module. In concept, the plant operates by taking in sea water that is initially used as a coolant as it passes through one side of a heat exchanger, such as the tube side. As the cool sea water passes through the various heat exchangers it becomes warmer, until a point at which the sea water is heated in the brine heater. The hot water from the brine heater is then returned through the heat exchangers on the opposite side, such as on the brine chamber or shell side, where the fresh sea water on the tube side removes heat from the brine chamber side and produces a condensate. This process is known to be reasonably efficient and has been widely applied.

In general operation, sea water enters the heat rejection module, is dearated, and passes through the heat transfer tubes of the heat recovery modules. Quite often, a portion of the hot brine from the shell side of the heat recovery modules is recycled into the incoming sea water in order to minimize energy expended in heating the sea water. At the completion of its travel through the tube side of the heat recovery modules, the water may be close to boiling temperature, such as at 90–95 degrees C., and at pressure above the boiling equilibrium for the temperature. In the brine heater, the sea water temperature is raised, typically by heat exchange with a clean fluid such as steam on the opposite side of the heat exchanger, to a temperature that may be in the range from 100 degrees to 130 degrees C. Then the hot brine is passed back through the heat recovery modules, but on the shell side. In each module, the multi-stage flash process is practiced to evaporate part of the brine and to recover the clean condensate. Each heat recovery module is divided into a plurality of successive stages, each at a lower pressure than the module upstream from it, so that the hot brine will flash-evaporate upon entering each stage. The clean vapor is condensed on the relatively cooler tubes carrying sea water, and the condensate or product water is captured independently of the brine. Both brine and product water then pass through the heat rejection module, where the product water is directed to storage, and the residual concentrated brine may be entirely rejected back into the sea, or part may be recycled with incoming sea water as stated above.

The size of such a MSF plant can be used as an indicator of material cost, construction cost, and construction difficulty. For a plant having a capacity of 2.5 million gallons per day, there would be potentially five heat recovery modules and one heat rejection module, each about seventy feet long by fifteen feet wide and twelve feet high, while the brine heater is about seventeen feet long. Water boxes and tube sheets are required at each end of each module and at each end of the brine heater, and piping must connect the tube sides and the brine chambers of each module to the next.

Figure 4:
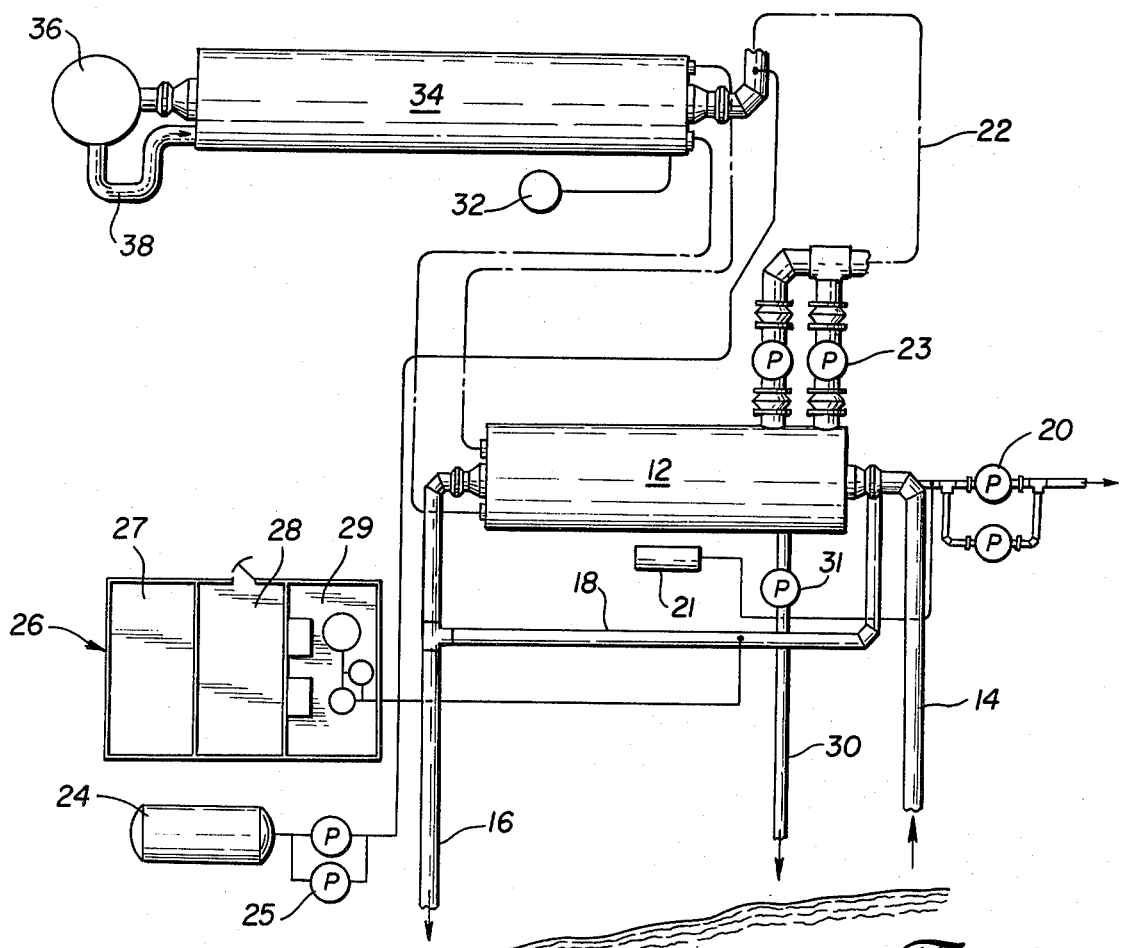
FIG. 4 is a schematic view of a distillation plant employing the invention.

The invention is best understood by initial reference to FIG. 4, illustrating a desalination plant of equal capacity to that mentioned above, but employing the method described herein. The heat rejection module 12 is substantially identical to known types as might be employed in the prior art. It has sea water intake 14 connected to one end thereof, and sea water reject conduit 16 at the other end thereof. Make-up line 18 passes from line 16 to the right hand end of the module 12 in the manner known in the art. Other known parts of the plant include product water pumps 20 connected to appropriate pipes; steam jet air eductor (SJAE) 21 drawing a vacuum and condensing water, brine recycle line 22 and recycle pumps 23; acid supply tank 24 and pumps 25; control building 26 containing power area 27, instrument area 28 and other auxiliary equipment 29; blowdown line 30 and blowdown pump 31.

The initial structural difference between FIG. 4 and the conventional desalination plant is the presence of compressor 32 pumping a supply of ambient air or other selected gas such as nitrogen or carbon dioxide into the tube side of the first heat recovery module 34. By way of contrast, this may be compared to the current practice of deaerating the incoming sea water through use of a deaerator at the cold side of the plant, such as in make-up line 18 according to the conventional practice.

While module 34 has been identified as the first heat recovery module, it may in fact be the sole heat recovery module, and within its confines may be located the brine heater as well. The interior construction of the module 34 may be quite similar to prior art heat exchangers in that at each end the module has a water box and tube sheet. The heat exchanger tubes run for the entire length between the tube sheets, and various baffles separate the module 34 into a plurality of flash chambers on the shell side of the heat exchanger. In the instance where the brine heater is included within module 34, the brine heater would be located near the left-hand end of the module and would be sealed from the flash chambers to preserve the cleanliness of the steam or other hot fluid employed on the shell side of the brine heater.

At the extreme left-hand end of module 34, which is the hot end of the plant, the tube side of the heat exchanger discharges into deaerator or degasifier 36, which removes the gas injected into the tube side of the process by the compressor 32, previously described. The degased brine is then directed through line 38 into the shell side of the module 34, for flash evaporation in the several stages of the heat recovery portion of module 34. The product water and residual brine may be thereafter processed in the conventional manner of the prior art.

The advantage gained in the present invention is reflected in the comparative size of the module 34, which has replaced the five heat recovery modules and one brine heater described in a similar conventionally designed desalination plant. While the conventional plant may use ¾ inch tubes, a plant using the two phase flow technique may use smaller diameter tubes, such as ⅝ inch diameter tubes. The liquid injection rate may be two feet per second and the gas injection rate may be, initially, 7–10 feet per second. Due to several factors of which temperature is predominent, the superficial gas velocity may increase from 7 to 28 feet per second during travel through the plant. The actual liquid velocity may increase from the initial rate of two feet per second to a resultant twelve feet per second at superficial gas velocity of twenty-eight feet per second. The total length of module 34 is about 110 to 120 feet long, and width and height are about 20 and 14 feet respectively. In addition, only two water boxes and tube sheets are employed in module 34, compared to twelve such units in the conventional heat recovery modules and brine heater that have been replaced. In addition, there is a notable decrease in the quantity of intermodule tubing. Yet, the plant illustrated in FIG. 4 is designed to have a capacity equal to that of the standard plant whose dimensions were given above. The overall total cost of the plant based on an annual amortized cost over a thirty year plant life and annual operating costs is reduced by twenty percent.

The advantages embodied in the plant of FIG. 4 should be appreciated to reside in greatly simplified plant construction as evidenced by the ability to prefabricate module 34 as a factory unit capable of being installed at the plant site with far less time and labor than is necessary when six units, required in the prior art, would have to be fabricated and installed. Further modification is anticipated wherein the heat rejection module is also eliminated and its functions incorporated into module 34, simplifying the mechanical design of the plant. The process employed within the further modified plant may also be simplified by eliminating of the recycle brine flow and allowing the plant to operate in a once-through mode. The module 34 may be installed vertically to provide other advantages with respect to heat transfer rates and overall plant costs.

With reference now to FIG. 1, module 34 differs from the standard heat recovery module in the structure of the water box 40, which is constructed to allow a gas under pressure to be added as the saline water to be heated enters the tubes or conduits 42 of the brine heat exchangers 44. The gas and saline water flow through the tubes 42 together, this forming a two-phase flow mixture. The flow rates of the gas and liquid are properly chosen to increase the heat transfer coefficient, thus reducing the required overall tube length. In addition, the presence of the gas phase within the tube increases the overall velocity, and also the levels of turbulence within the fluids inside of the tube, so that the likelihood of fouling is much reduced. Accordingly, a smaller quantity of liquid can be safely introduced into each tube. Thus, the number of tubes required may be increased, further reducing the required length of each tube. The introduction of the two-phase flow system thus permits significant variations to be achieved in the values of several critical design parameters, such as heat transfer coefficient, number of tubes in parallel, tube diameter, etc., and permits significant changes in the geometrical configuration of the desalination plant to be achieved. The net result can be some or all of the following advantages: reduced overall plant length; reduced quantities of construction material required; reduced ground area required for the plant; reduced total surface area for the heat exchanger tubing; reduced number of tubes; reduced number of separate vessels needed to house the total quantity of heat exchanger surface; and reduced quantity of energy consumption for the overall desalination plant. In addition, the gas or gasses used to initiate and sustain two-phase flow in the heat exchanger tubes will, in some cases, themselves inhibit or prevent scale formation, thereby eliminating the necessity to provide acid or chemical addition to the brine feed during pretreatment, and perhaps eliminating the need to remove oxygen, by a separate deaeration step, from the saline water feed stream.

As is known in the art, the brine heat exchangers 44 are constructed with an outer shell 46 having a flange 48 at the open end thereof. Within the open end is the tube sheet 50 having a plurality of holes passing through it, each having a heat exchanger tube connected to the margins of the hole, such as by welding, roll forming, or sealing means such as an O-ring seal. Water box 40 attaches to the exchanger 44, such as by a bolted flange 52 that mates with flange 48. For purposes of the invention, the water box has been altered from conventional structure so that the gas can be introduced into the saline water within the heat exchanger tubes in a uniform manner within each tube 42. The saline water enters the water box through inlet 54 and then enters each tube through the open end of the tube in the tube sheet 50. A gas distribution chamber comprises a domed housing 58 having connecting means such as flange 60 for attachment to the water box at flange 62. Another tube sheet 64 is located in the housing 58 to define, in combination with the housing, the gas chamber 66. Tube sheet 64 has gas distribution tubes 72 mating with the holes in the sheet, as explained above with respect to tube sheet 50, but the tubes 72 are of smaller diameter than tubes 42 such that the former tubes can fit inside the latter tubes and a radial space will remain between the two to permit the entry of liquid from the water box. Thus, as illustrated in FIG. 1, when the gas distribution chamber and water box are connected to the brine heat exchanger, the gas distribution tubes 72 extend into the heat exchanger tubes to supply gas uniformly to each of the latter tubes.

In principle, almost any gas may be used to achieve the desired two phase flow system, but as a practical matter for economic reasons, the aforestated gases of preference are air, nitrogen and carbon dioxide. After the gas and brine mixture are heated to the maximum temperature within the brine heat exchanger, including the brine heater, some or all of the gas is separated from the brine in a gas-liquid separation vessel, for example by the degasifier 36, FIG. 4, or alternatively, in the flash chambers themselves. If the gas used is nitrogen or carbon dioxide, or some other costly gas, then the gas separated from the liquid would be collected, recompressed, and recycled at the inlet 70 of the heat exchangers. However, if the gas used is air, it could either by recycled as described above or rejected to the atmosphere after separation from the brine.

Although the maximum advantage of the invention is attained in those situations where it is possible to decrease the heat exchanger tube length sufficiently so that only one vessel is needed to house all of the heat transfer surface and all flash chambers, it is also applicable to situations wherein more than one module is required. In the latter instance, the partially heated saline waters will leave the water box at the exit end of one module and flow into the water box at the inlet end of the next module. Two-phase flow distribution means will then be required to transfer the fluid when the two-phase flow system is utilized, to ensure that the gas phase leaving the heat exchanger tubes of one module is evenly and uniformly distributed among all of the tubes as it enters the tubes of the next module.

Figure 2:
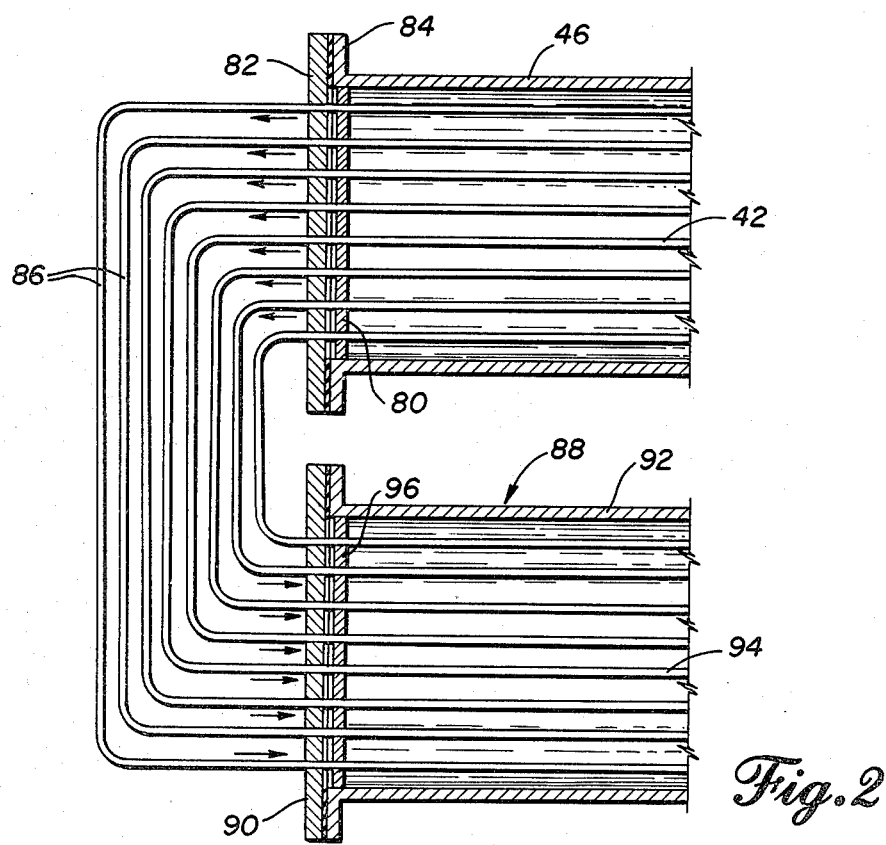
FIG. 2 is a longitudinal cross-sectional view of two heat exchanger modules showing a device for carrying two-phase flow from the exit end of the upstream module to the entrance end of the downstream module.

FIG. 2 illustrates one suitable distribution means for a multiple module plant. At the opposite end of the heat exchanger from that shown in FIG. 1, the shell 46 contains exit tube sheet 80 through which the heat exchanger tubes 42 pass. An external support header 82 is bolted to shell 46 at flange 84, and carries external tubes 86 that mate snugly with the heat exchanger tubes in tube sheet 80. In this manner, the external tubes direct the two-phase flow mixture to the next successive heat exchanger 88, which has an entry end substantially identical to the exit end of the preceeding exchanger, including external support header 90 carrying the tubes 86 and connected to heat exchanger shell 92 to mate tubes 86 with heat exchanger tubes 94 carried in entry tube sheet 96. Any number of heat recovery modules could be interconnected in this manner, wherein the fluid from each tube of one module is directed specifically to a corresponding tube in the next module.

Figure 3:
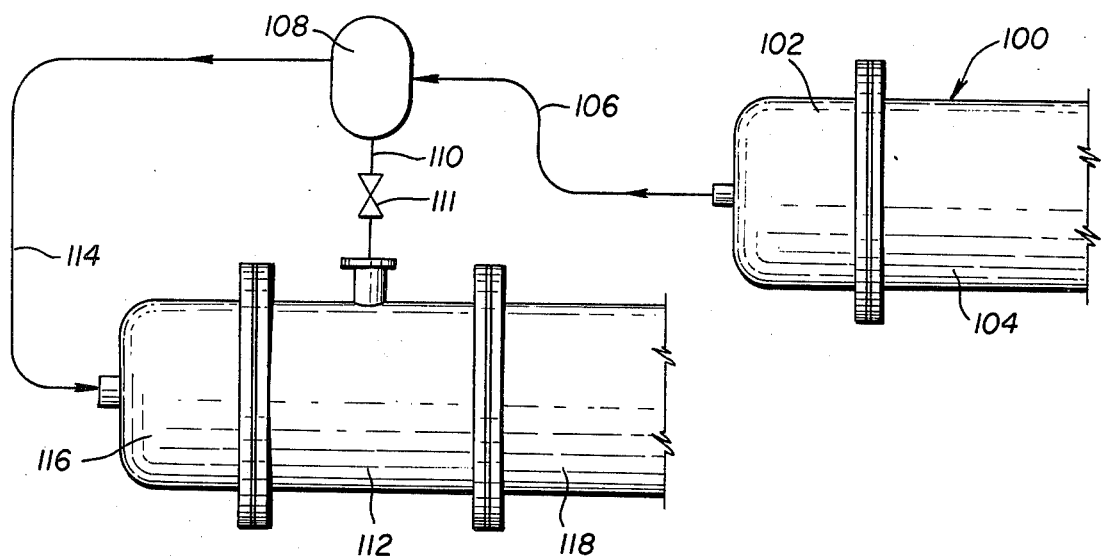
FIG. 3 is a diagrammatic view of two heat exchanger modules with an inter-module device for separating the two-phase flow after the exit end of the upstream module and recombining the phases at the entrance end of the downstream module.

Another distribution means for a multiple module plant is illustrated in FIG. 3, wherein an inter-module gas-liquid separator is employed within which the gas and liquid leaving one module are separated before they are added into the tubes of the next module. The exit end of the module 100 is illustrated to include water box 102 connected to the exit end of the brine heat exchanger 104, which includes an exit tube sheet wherein the tubes open into the water box. The two-phase mixture empties into the water box and subsequently is routed through conduit 106 to interstage gas-liquid separator 108, where the separated liquid is routed through conduit 110, through automatic valve 111 for controlling the liquid level in the separator, to water box 112, substantially identical to water box 40 of FIG. 1. The separated gas phase is routed through conduit 114 to gas distribution chamber 116 substantially identical to gas distribution chamber 66 of FIG. 1. In this manner, the subsequent heat exchanger 118 receives the two-phase flow mixture in the identical manner as the original heat exchanger, as described in connection with FIG. 1.

Another aspect of this invention involves the vertical configuration for the MSF distillation plant, or for the brine heaters of other distillation processes. For the vertical configuration to be practical and economical, it is necessary that the tube length be much less than they are with the normal method of preheating the brine in a single phase, all liquid heater. This can be accomplished if the two-phase flow heating system is used. With respect to the process aspects, this would have the same advantages as the horizontal application of this invention. In addition, with respect to construction aspects, the vertical configuration permits that the MSF distillation plant be prefabricated in modules at the factory, and that these modules be assembled in the field in a shorter time, and at a lower cost, than by conventional means. For example, the entire short tube bundle can be fabricated as a unit and installed vertically as a single module. A cylindrical annular shell surrounding the tube bundle contains the flash chambers, one located above the next. The cylindrical shell can be prefabricated as either a single unit, or as several smaller units to be fastened together, as for example, with bolted and gasketed flanges. The prefabricated shell unit or units would be slipped over the erected tube bundle. The top and bottom heads could then be secured in place, and the external piping could then be installed.

I claim:

1. The method of improved heat transfer as practiced in a heat exchanger module of the type having a tube side including a plurality of tubes and a shell side defining a volume surrounding said plurality of tubes, wherein a liquid is circulated on the tube side of the heat exchanger module for heat transfer through the tube walls, the improvement comprising: introducing into each of said plurality of tubes on the tube side of the heat exchanger module a substantially equal quantity of non-condensable gas for simultaneous flow in the same direction of flow through the tubes as the liquid, the gas being under sufficient pressure and in sufficient quantity to create, in combination with the liquid, a two phase flow regime throughout substantially the full length of the tubes on the tube side of the heat exchanger module to achieve a relative increase in heat transfer coefficient and overall velocity and turbulence within the tubes to permit overall shorter tube length or reduced heat exchanger surface area, with respect to tube length or heat exchanger surface area of a heat exchanger employing one-phase liquid flow in the tubes.

2. The method of claim 1, wherein said tube side of the heat exchanger module employs a plurality of tubes, and the improvement further comprises introducing said gas stream uniformly into each of said tubes.

3. The method of claim 1, wherein at least first and second heat exchanger modules are employed, further comprising
   (a) collecting said two phase flow mixture exiting the heat exchanger tubes of the first module; and
   (b) distributing the gas phase of the mixture evenly among the heat exchanger tubes of said second module.

4. The method of claim 3, wherein said collecting and distributing steps are accomplished by transmitting the contents of each heat exchanger tube of said first module to a heat exchanger tube of said second module.

5. The method of claim 3, wherein said collecting and distributing steps are accomplished by the steps comprising:
   (a) receiving said two-phase flow mixture from the first module heat exchanger tubes in a receptacle;
   (b) separating at least a portion of the gas phase from the two-phase flow mixture to leave a residual fluid;
   (c) distributing said residual fluid to the heat exchanger tubes of said second module; and
   (d) injecting said separated gas phase into the second module heat exchanger tubes to reestablish a two-phase flow mixture.

6. The method of claim 1, further comprising:
   (a) separating said gas from the two-phase flow mixture when the mixture has passed through the heat exchanger tubes;
   (b) cycling the gas to the cool end of the heat exchanger module; and
   (c) reintroducing the gas into the liquid entering the cool end of the tube side of the heat exchanger module.

7. The method of claim 1, wherein the heat exchanger is of the type employed in the multi-stage flash distillation process and has a hot end and a cool end on the tube side thereof for circulation of liquid from the cool end to the hot end on the tube side, wherein the liquid comprises saline water.

* * * * *